United States Patent
Bieltz et al.

(10) Patent No.: US 9,862,363 B2
(45) Date of Patent: Jan. 9, 2018

(54) METHOD FOR SETTING A PARKING BRAKE IN A VEHICLE

(75) Inventors: Karsten Bieltz, Mudelsheim (DE); Simon Hauber, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 1051 days.

(21) Appl. No.: 13/404,153

(22) Filed: Feb. 24, 2012

(65) Prior Publication Data
US 2013/0060439 A1    Mar. 7, 2013

(30) Foreign Application Priority Data
Feb. 25, 2011    (DE) .................. 10 2011 004 741

(51) Int. Cl.
| | | |
|---|---|---|
| B60T 13/74 | (2006.01) | |
| B60T 7/10 | (2006.01) | |
| B60T 7/04 | (2006.01) | |
| B60T 7/08 | (2006.01) | |
| B60T 7/12 | (2006.01) | |

(52) U.S. Cl.
CPC .............. B60T 7/107 (2013.01); B60T 7/042 (2013.01); B60T 7/085 (2013.01); B60T 7/12 (2013.01); B60T 13/741 (2013.01)

(58) Field of Classification Search
None
See application file for complete search history.

(56) References Cited

U.S. PATENT DOCUMENTS

| | | | |
|---|---|---|---|
| 7,227,324 B2 | 6/2007 | Erben et al. | |
| 8,215,725 B2* | 7/2012 | Jackson et al. | 303/124 |
| 2006/0170282 A1* | 8/2006 | Yamaguchi et al. | 303/20 |
| 2009/0099748 A1* | 4/2009 | Watanabe et al. | 701/70 |
| 2011/0198167 A1* | 8/2011 | Huppunen et al. | 188/171 |
| 2011/0278105 A1* | 11/2011 | Maron et al. | 188/72.1 |

FOREIGN PATENT DOCUMENTS

| | | |
|---|---|---|
| DE | 103 61 042 | 5/2005 |
| JP | H08-142820 A | 6/1996 |
| JP | 2003-083373 A | 3/2003 |
| JP | 2008-068841 A | 3/2008 |

\* cited by examiner

Primary Examiner — Abby Lin
Assistant Examiner — Paul Castro
(74) Attorney, Agent, or Firm — Norton Rose Fulbright US LLP; Gerard Messina

(57) ABSTRACT

In a method for setting a parking brake that has an electromechanical brake device having an electrical brake motor, the release time duration for displacing the electrical brake motor in the release direction is determined from the closing time duration in which the brake motor was previously displaced in the closing direction.

10 Claims, 1 Drawing Sheet

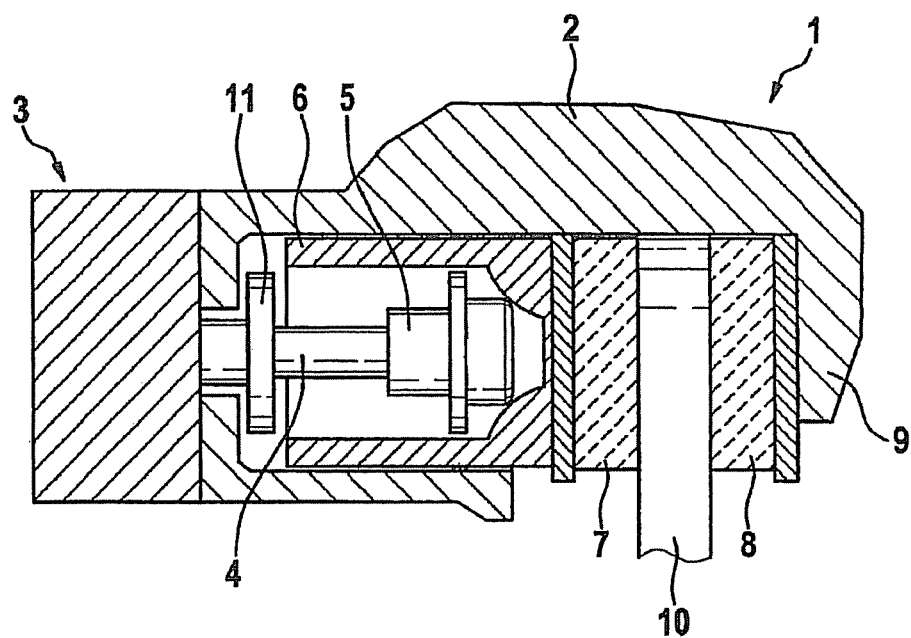

METHOD FOR SETTING A PARKING BRAKE IN A VEHICLE

CROSS REFERENCE

The present application claims the benefit under 35 U.S.C. §119 of German Patent Application No. 102011004741.7 filed on Feb. 25, 2011, which is expressly incorporated herein by reference in its entirety.

FIELD OF THE INVENTION

The present invention relates to a method for setting a parking brake in a vehicle.

BACKGROUND INFORMATION

German Patent No. DE 103 61 042 B3 describes a vehicle parking brake capable of producing a clamping force that holds the vehicle at a standstill. The parking brake has as an actuator an electrical brake motor upon the actuation of which a brake piston bearing a brake lining is displaced axially in the direction towards a brake disk.

If an electrical or mechanical defect occurs during the clamping or closing process of the parking brake, the controlling of the electrical brake motor can be interrupted. In order to make it possible to restart the vehicle subsequent to this, the parking brake must be released. The release path traveled in the direction of release by the electrical brake motor, or by an actuating element driven by the brake motor, can be determined on the basis of rotational speed signals detected during the closing process.

SUMMARY

An object of the present invention is to use simple measures, without the use of rotational speed signals, to set with a high degree of precision the release path that has to be traveled by the electrical brake motor of an electromechanical parking brake in order to dismantle the clamping force.

An example method according to the present invention relates to an electromechanical vehicle parking brake including an electrical brake motor capable of producing a clamping force. The rotational movement of the rotor of the electrical brake motor is transmitted in an axial actuating movement of an actuating element, for example a spindle, via which a brake piston bearing a brake lining is pressed axially against a brake disk.

If warranted, the parking brake can be provided with an additional brake device in order to enable, as needed, the production of an additional clamping force in addition to the electromechanical clamping force. The additional brake device is, in particular, the hydraulic vehicle brake of the vehicle, whose hydraulic pressure acts on the brake piston.

In the example method according to the present invention, the duration of the release time during which the electrical brake motor is displaced in the release direction in order to dismantle the clamping force is determined from the duration of the closing time in which, in a closing process that took place previously, the electrical braking process was displaced in the direction of the closing or clamping position in order to build up the clamping force. The release time duration and the closing time duration each relate here to the actuation of the electrical brake motor in the release or closing direction, the respective process being carried out with a characteristic speed profile. Both the release process and the closing process are usefully actuated with a constant speed, the startup or braking processes of the brake motor being carried out dynamically. However, it is also possible for a speed profile during the release and/or closing process to have a non-constant speed.

An advantage of this example embodiment is that no rotational speed information concerning the electrical brake motor is required, so that a rotational speed sensor can be omitted. In addition, it is advantageous that the actuating element on which the electrical brake motor acts—standardly the spindle—has to be moved back during the release process only so far as is absolutely necessary. The displacement path during the release process corresponds to the displacement path during the closing process, or stands in a definite ratio thereto. This ensures that the brake piston on the one hand is drawn back as far as necessary to achieve a complete dismantling of the clamping force, so that in this way the necessary distance of the spindle from the piston is set. Usefully, the moving back takes place until the required distance of the spindle from the piston is set. On the other hand, it is ensured that during the release process the actuating element is not displaced up to the reaching of an end stop.

It may be advantageous to use the closing time duration of an immediately preceding closing process when determining the release time duration. However, it is also possible to take into consideration an earlier closing process, or to form a mean value from a plurality of closing processes, used as a basis for the release time duration.

According to a further useful example embodiment, the release time duration is determined by multiplying the closing time duration by an adaptation factor that is determined in particular from electromotoric parameters. The adaptation factor is preferably a constant. The factor is in particular at least equal to 1, so that the release time duration is not shorter than the closing time duration. This ensures that the electromechanical braking device is reliably taken to a range in which the clamping force is completely dismantled and the required distance of the spindle from the piston is set.

The adaptation factor is advantageously determined from the ratio of the motor voltage during the closing process to the motor voltage present at the beginning of the release process in the electrical brake motor. For the motor voltage in the closing process, a mean voltage is advantageously used that represents the mean value over the entire preceding closing process. This ensures that dynamic influences during startup and braking of the electric brake motor play only a subordinate role.

The example method for determining the release time duration can be applied during all release processes of the electromechanical brake device. According to an advantageous embodiment, it is provided that the method is applied in particular in cases of an interruption of the closing or clamping process of the parking brake. The method can also advantageously be used in cases in which a desired startup is recognized during the closing process.

The example method according to the present invention runs in a regulating or control device in the vehicle that can be a component of the parking brake system.

Further advantages and useful embodiments may be understood from the description below and the FIGURE.

BRIEF DESCRIPTION OF THE DRAWING

The FIGURE shows a section through an electromechanical vehicle parking brake in which the clamping force is produced by an electrical brake motor.

DETAILED DESCRIPTION OF EXAMPLE EMBODIMENTS

The FIGURE shows an electromechanical parking brake 1 for holding a vehicle at a standstill. Parking brake 1 has a brake caliper 2 having a binding piece 9 that overlaps a brake disk 10. As an actuating element, parking brake 1 has an electric motor as brake motor 3 that rotationally drives a spindle 4 on which a spindle component 5 is rotatably mounted. When there is rotation of spindle 4, spindle component 5 is axially displaced. Spindle component 5 moves inside a brake piston 6, bearing a brake lining 7, that is pressed against brake disk 10 by brake piston 6. On the opposite side of brake disk 10 there is situated a further brake lining 8 that is held stationary on binding piece 9.

Inside brake piston 6, spindle component 5 can move axially forward in the direction toward brake disk 10 when there is a rotational movement of spindle 4, or, when there is a rotational movement of spindle 4 in the opposite direction, spindle component 5 can move axially backward until it reaches a stop 11. In order to produce a clamping force, spindle component 5 acts on the inner end surface of brake piston 6, causing brake piston 6, mounted displaceably in parking brake 1, to be pressed with brake lining 7 against the facing end surface of brake disk 10.

If necessary, the parking brake can be supported by a hydraulic vehicle brake so that the clamping force is composed of an electromotoric portion and a hydraulic portion. When there is hydraulic support, the rear side, facing the brake motor, of brake piston 6 is acted on by hydraulic fluid under pressure.

The release of the parking brake is carried out as a function of time. For this purpose, release time duration $t_L$ is determined during which the electric brake motor is displaced in the release direction, in particular with a constant displacement speed. Release time duration $t_L$ is determined as a function of closing time duration $t_S$ from an immediately preceding closing process of the parking brake. According to the equation:

$$t_L = t_S \cdot F$$

release time duration $t_S$ is a function of an adaptation factor F and the closing time duration $t_S$ of the preceding closing process, adaptation factor F designating the ratio of average motor voltage $\overline{U}_S$ during the closing process to motor voltage $U_L$ at the beginning of the release process:

$$F = \frac{\overline{U}_S}{U_L}$$

Release time duration $t_L$ determined in this way is determined in particular in cases of disturbance, for example after an interruption of the closing process or if a desired startup is recognized during the closing process.

It can be useful for the release time duration to correspond at least to the closing time duration. This can be achieved according to the above relationship if adaptation factor F assumes a value of at least 1.

What is claimed is:

1. A method for setting a parking brake that has an electromechanical brake device having an electrical brake motor for producing an electromechanical clamping force, the method comprising:

determining a release time duration for displacing the electrical brake motor in a release direction from a closing time duration in which the electrical brake motor was previously displaced in a closing direction.

2. The method as recited in claim 1, wherein the closing time duration of an immediately preceding closing process is used in the determining of the release time duration.

3. The method as recited in claim 1, wherein the release time duration is determined by multiplying the closing time duration by an adaptation factor determined from electromotoric parameters:

$$t_L = t_S \cdot F$$

wherein $t_L$ is the release time duration, $t_S$ is the closing time duration, and F is the adaptation factor.

4. The method as recited in claim 3, wherein the adaptation factor is determined from a ratio of a motor voltage during the closing process to a motor voltage at a beginning of the release process:

$$F = \frac{\overline{U}_S}{U_L}$$

wherein $\overline{U}_S$ is the motor voltage during the closing process, and $U_L$ is the motor voltage at the beginning of the release process.

5. The method as recited in claim 4, wherein an average motor voltage of the electrical brake motor is taken into account during closing process.

6. The method as recited in claim 1, wherein the release time duration corresponds at least to the closing time duration.

7. The method as recited in claim 1, wherein the method is performed in cases of an interruption of a closing process.

8. The method as recited in claim 1, wherein the method is performed in cases in which a desired startup is recognized during a closing process.

9. A regulating or control device for setting a parking brake that has an electromechanical brake device having an electrical brake motor for producing an electromechanical clamping force, the device configured to determine a release time duration for displacing the electrical brake motor in a release direction from a closing time duration in which the electrical brake motor was previously displaced in a closing direction.

10. A parking brake in a vehicle having a regulating or control device, the device for setting a parking brake that has an electromechanical brake device having an electrical brake motor for producing an electromechanical clamping force, the device configured to determine a release time duration for displacing the electrical brake motor in a release direction from a closing time duration in which the electrical brake motor was previously displaced in a closing direction.

* * * * *